March 22, 1932.   H. SCHIÖLER   1,850,638
COLLAPSIBLE AND TRANSPORTABLE HOUSE
Filed Nov. 19, 1929   3 Sheets-Sheet 1
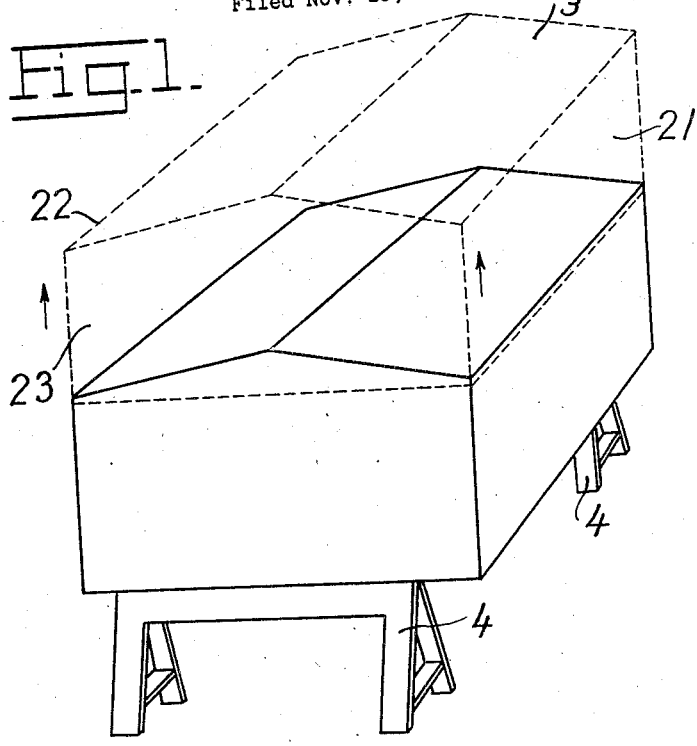
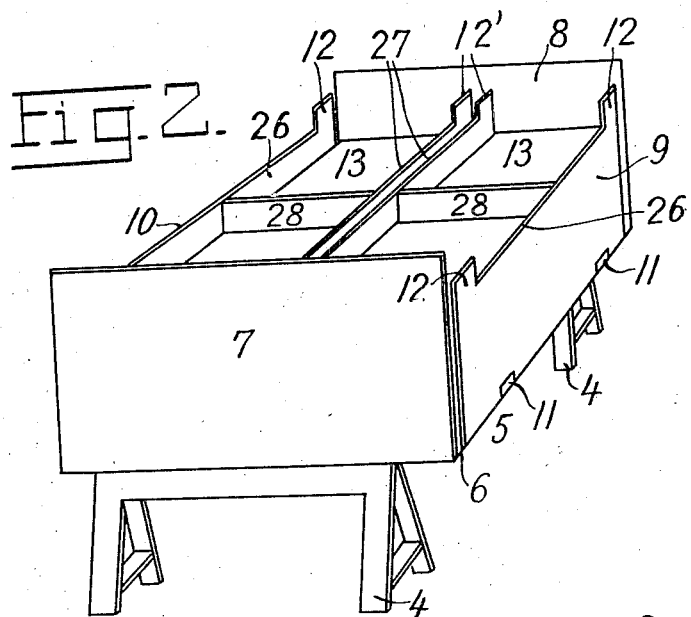
Helge Schiöler, Inventor,
By Byrnes Townsend & Brichenstein, Attorneys March 22, 1932.  H. SCHIÖLER  1,850,638
COLLAPSIBLE AND TRANSPORTABLE HOUSE
Filed Nov. 19, 1929   3 Sheets-Sheet 2
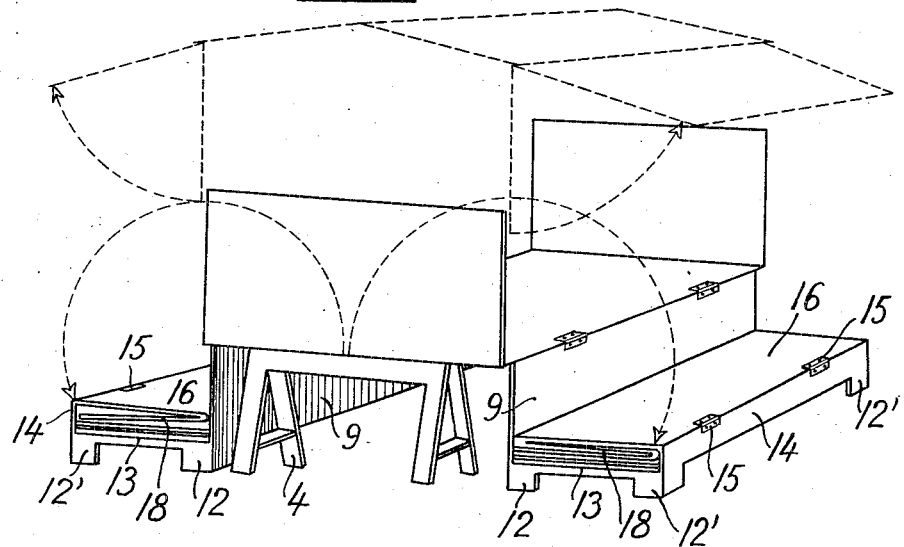
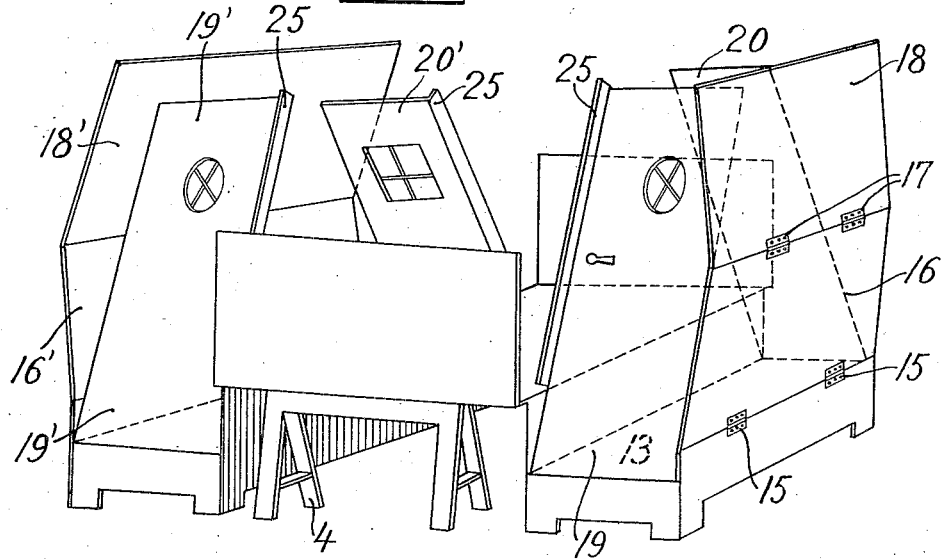

March 22, 1932.  H. SCHIÖLER  1,850,638
COLLAPSIBLE AND TRANSPORTABLE HOUSE
Filed Nov. 19, 1929   3 Sheets-Sheet 3
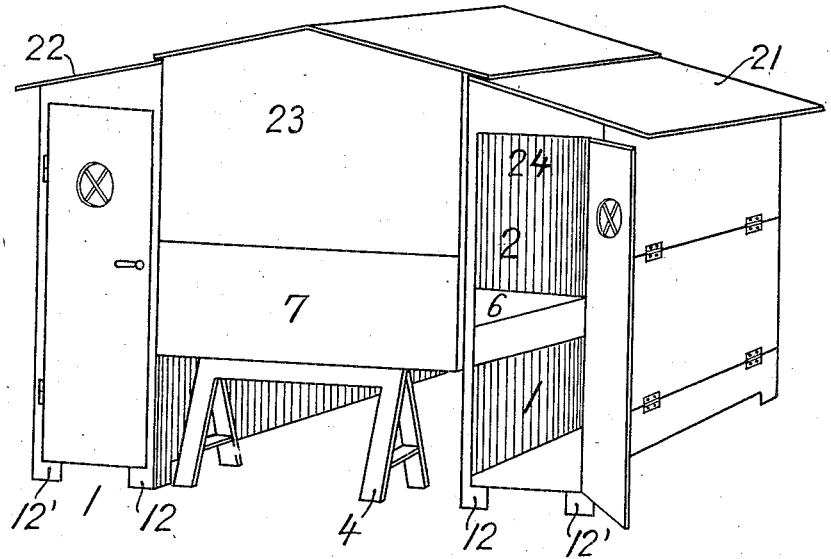
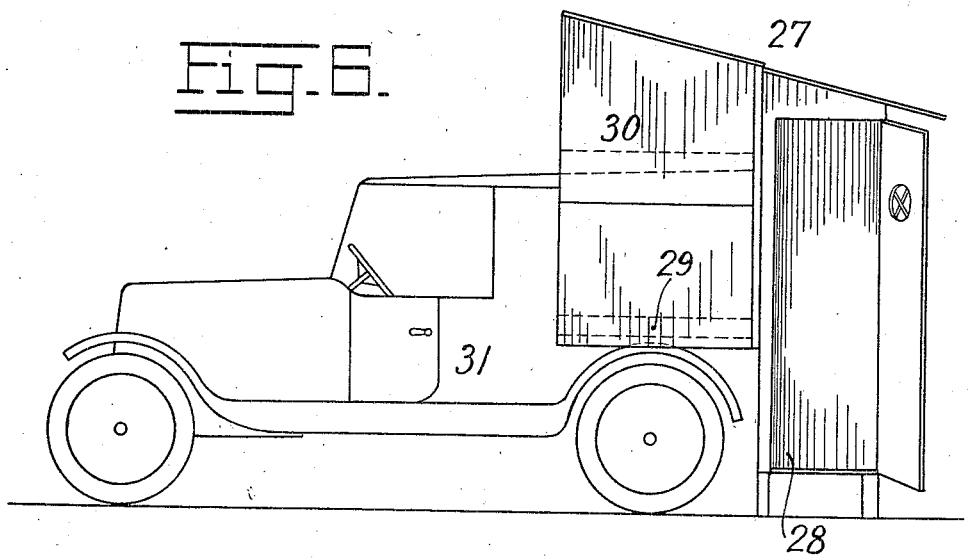

Patented Mar. 22, 1932

1,850,638

UNITED STATES PATENT OFFICE

HELGE SCHIÖLER, OF OSLO, NORWAY

COLLAPSIBLE AND TRANSPORTABLE HOUSE

Application filed November 19, 1929. Serial No. 408,345.

The present invention relates to improvements in collapsible and transportable houses of that type which easily can be transported on a trailer and be used for camping purposes and the like.

One object of the invention is to provide special advantageous novel arrangements, whereby a collapsible house in collapsed condition will occupy the least possible space and whereby the collapsed house, which generally may have the form of a trunk, inside the said trunk will have suitable space for storing away household utensils, beddings and other camping equipment which it may be desirable to carry along.

Another object of the invention is to provide a camping house comprising floor spaces at different elevations adapted for bed places and a living compartment and according to this invention the floor space at the lower level is connected to the higher floor space in such a way that the lower floor space, when the house is to be folded together, may be swung about the edge of the higher floor and thus occupy a place at a higher elevation, exactly above and parallel with that floor space, which, when the house is folded out, will be at the higher plane.

The house according to this invention may be constructed in several ways and can be used for different purposes; but the preferred embodiment of this invention is a house, especially suited for camping purposes and adapted to be transported on a trailer, a sledge, a truck or the like, and this embodiment is illustrated in the accompanying drawings and described in the following, in order to make the invention easily understood.

In the drawings,

Fig. 1 illustrates in perspective view the house in collapsed condition, where it has the general form of a trunk.

Fig. 2 is a view similar to Fig. 1, where the top portion of the trunk has been removed.

Fig. 3 illustrates the first operation when setting up the house.

Fig. 4 is another view, illustrating the next operation.

Fig. 5 illustrates the house, completely finished, and

Fig. 6 illustrates a modification where a smaller house according to this invention is placed on a truck.

The camping house, which is completely shown in Fig. 5, consists in this embodiment of two side compartments or corridors 1 and a middle compartment 2 the floor of which is at a level suitable for a bed or sleeping place and is provided with suitable side walls, a door, a roof etc. which will be described in detail in the following. When the house is collapsed, it has the form illustrated in Fig. 1, which very much resembles a large trunk. The trunk has a removable top cover 3 with depending sides 21, 22 and 23.

When the house is to be set up, the trunk may be placed on horses 4 or may be left on the trailer, if such is used for the transportation of the trunk. The first step in the setting up of the house consists in elevating the top portion of the trunk 3. This may in a very well known manner be completed by mechanical means, such as gears and chains; but as this is no part of this invention and is well known in houses of this type, it has not been shown and will not be described in detail.

If no means are provided for raising the top, this may simply be lifted off, and the lower part of the trunk will be uncovered as shown in Fig. 2.

The lower part of the trunk, which is marked 5, consists of a floor space 6 and two end sections 7 and 8, rigidly fixed to the said floor space. The space between the two ends 7 and 8 provides storage room for the entire house, which as can be seen in Fig. 2 comprises two floor sections 13 rigidly fixed to the side sections 9 and 10 which again are hinged to the sides of the trunk floor 6 by means of hinges 11. The side sections 9 are provided with legs 12, which—when swung down as shown in Fig. 3—will rest against the floor or ground. The floor spaces 13 can further be provided with legs 12', which in addition to the previously mentioned legs 12 will rest against the ground, when the said floor space has been swung out. The outer edge of the floor spaces 13, when these are in outswung position, is further provided with narrow wall section 14, which at the upper edge by means of hinges 15 is connected to wall sections 16, which again at the other edge by means of hinges 17 are connected to wall sections 18. When the side sections 9 with the floor sections 13 have been swung out in the open position (Fig. 3), the wall sections 16 and 18 are raised by being swung about the hinges 15 and 16 (Fig. 4) and may be secured together by means of suitable hooks or the like, not shown.

At each end of the floor sections 13 wall sections 19 and 20 are attached by means of suitable hinges. When the floor sections 13 and the wall sections 16 and 18 are in proper position, the wall sections 19 and 20 are raised, one after the other. The different wall sections are hooked together by suitable hooks or the like (not shown) and may also, if desired, in a generally known way be provided with suitable air-tightening means, which will prevent draft from entering through the joints.

The part of the house which has been described in the foregoing and which comprises the floor space 13, constitutes the living room in the house. One or more such rooms may be provided. The remainder of the floor in the house is at a higher level and may be suitably used as a bed and may, if so desired, be provided with permanent matresses. The remainder middle part of the walls (Fig. 4) and the roof are made up by the top 3 of the trunk, this being provided with hinged side sections 21, 22 which, when swung out will cover the corridors and with rigidly fixed end sections 23 and 24 will cover the central portion of the wall.

It will easily be understood that the length of the floor 13 must be a little shorter than the length of the floor space 6 in the trunk in order to make it possible to swing the floor space 13 in over the floor space 6. For this reason it is thus necessary to provide the side wall sections 19 and 20, respectively 19' and 20' with outbent edges 25, which when the wall sections 19—20 respectively 19'—20' are raised in normal position, will provide for an airtight connection between these wall sections and the wall sections 7 and 23. Between the legs 12—12 and 12'—12' the floor sections 13 are provided with side sections 26 and 27 and can also be provided with a transversely arranged web 28, which primarily will serve the purpose of stiffening the whole construction and secondary will provide for a storage room for household utensils, when the house is collapsed.

It is evident that the foregoing description of the invention with reference to the details shown in the drawings is only for the purpose of making the invention plainly understood. Thus many changes and modifications may be done without departing from the scope of this invention, which is only limited by the appended claims.

Fig. 6 illustrates a modification of the invention, where the collapsible house is arranged directly on top of an automobile as a part of same. The automobile is here marked with 31, and the house 27 may contain two beds 29 and 30 in different elevations, 28 indicates the corridor for the house. Otherwise the construction of this house does not differ from the embodiment described with reference to Figs. 1 to 5 incl.

Claims:

1. A collapsible and portable house, which in the collapsed condition has the form of a trunk comprising a topcover adapted to be lifted off to form the roof of the house, and a floor, hinged sides on the said floor having rigidly fixed thereto floor sections which in unison with the said sides may be swung out to form additional floor space, said hinged sides being adapted to support the first mentioned floor at a certain distance from the ground when in the outswung position.

2. A collapsible and portable house which in the collapsed condition has the form of a trunk comprising a topcover adapted to be lifted off and form the roof of the house, a floor, a hinged side on the said floor having fixed thereto a floor section which in unison with the said side may be swung out to form additional floor space, said hinged side being adapted to support the first mentioned floor at a certain distance from the ground when in the outswung position and the said floor section having hinged thereto around its three outer edges wall sections which are adapted to form the walls around the said swingably mounted floor section.

3. A collapsible and portable house which in the collapsed condition has the form of a trunk comprising a topcover adapted to be lifted off and form the roof of the house, a floor, a hinged side on the said floor having rigidly fixed thereto a floor section which in unison with the said side may be swung out to form additional floor space, said hinged side being adapted to support the first mentioned floor at a certain distance from the ground when in the outswung position, said floor having upright rigidly fixed ends forming the lower part of the outside wall surrounding the said floor and the said cover having depending fixed ends registering in its lifted position with the ends of the said floor and forming the upper part of the said wall section.

4. A collapsible and portable house which in the collapsed condition has the form of a trunk comprising a topcover adapted to be lifted off to form the roof of the house, a floor, a hinged side on the said floor having rigidly fixed thereto a floor section which in unison with the said side may be swung out to form additional floor space, said hinged side being adapted to support the first mentioned floor at a certain distance from the ground when in the outswung position and the said floor section having hinged thereto around its three outer edges wall sections which are adapted to form the walls around the said swingably mounted floor section, and a frame adapted to rest against the ground in the outswung position and to form a storage compartment for household utensils and the like, when in the inswung and collapsed position.

5. A collapsible and portable house which in the collapsed condition has the form of a trunk comprising a topcover adapted to be lifted off to form the roof of the house, a floor, a hinged side on the said floor having rigidly fixed thereto a floor section which in unison with the said side may be swung out to form additional floor space, said hinged side being adapted to support the first mentioned floor at a certain distance from the ground when in the outswung position and the said floor section having hinged thereto around its three outer edges wall sections which are adapted to form the walls around the said swingably mounted floor section, said walls comprising end sections having outbent angular strips registering with rigidly fixed end sections on the first mentioned floor and on the trunk cover.

6. A collapsible and portable house which in the collapsed condition has the form of a trunk comprising a topcover adapted to be lifted off to form the roof of the house and a floor, hinged sides on the said floor having rigidly fixed thereto floor sections which in unison with the said sides may be swung out to form additional floor space, said hinged sides being adapted to support the first mentioned floor at a certain distance from the ground when in the outswung position and the said floor sections having hinged thereto around their three outer edges wall sections which are adapted to form the walls around the said swingably mounted floor sections, a frame adapted to rest against the ground in the outswung position and to form a storage compartment for household utensils and the like when in the inswung and collapsed position, the said first mentioned floor having upright rigidly fixed ends forming the lower part of the outside wall surrounding the said floor and the said cover having depending fixed ends registering in its lifted position with the ends of the said floor and forming the upper part of the said ends of the wall sections, and the said walls surrounding the swingably mounted floor sections comprising end sections having outbent angular strips registering with rigidly fixed end sections on the first mentioned floor and on the trunk cover.

In testimony whereof I have signed my name unto this specification.

HELGE SCHIÖLER.